US007370854B2

(12) United States Patent
Sandhu et al.

(10) Patent No.: US 7,370,854 B2
(45) Date of Patent: May 13, 2008

(54) SELF DAMPING COMPRESSION SPRING ASSEMBLY FOR A FUEL INJECTION DEVICE

(75) Inventors: Avtar S Sandhu, Bloomington, IL (US); Sami I. El-Sayed, Bloomington, IL (US)

(73) Assignee: Caterpillar, Inc., Peoria, IL (US)

( * ) Notice: Subject to any disclaimer, the term of this patent is extended or adjusted under 35 U.S.C. 154(b) by 558 days.

(21) Appl. No.: 11/122,608

(22) Filed: May 5, 2005

(65) Prior Publication Data

US 2006/0249123 A1 Nov. 9, 2006

(51) Int. Cl.
*F16F 1/06* (2006.01)
*B60G 11/14* (2006.01)

(52) U.S. Cl. ....................................... 267/169; 267/287

(58) Field of Classification Search ................ 267/169, 267/287

See application file for complete search history.

(56) References Cited

U.S. PATENT DOCUMENTS

| | | | | |
|---|---|---|---|---|
| 2,673,084 | A | 3/1954 | Blythe | |
| 2,832,587 | A | 4/1958 | Robert | |
| 2,904,329 | A | 9/1959 | Joseph | |
| 2,924,447 | A | 2/1960 | Ernest | |
| 3,028,156 | A | 4/1962 | Roehrig | |
| 3,034,777 | A | 5/1962 | Osterhoudt | |
| 3,132,855 | A | 5/1964 | Davis | |
| 3,141,661 | A | 7/1964 | Melton et al. | |
| 3,326,545 | A | 6/1967 | Bache et al. | |
| 3,622,142 | A | 11/1971 | Lorio | |
| 3,866,896 | A | 2/1975 | Wehner | |
| 4,006,893 | A * | 2/1977 | Spencer | 267/287 |
| 4,614,333 | A | 9/1986 | Gaylord | |
| 4,779,854 | A | 10/1988 | Idigkeit et al. | |
| 4,856,765 | A * | 8/1989 | Kohno et al. | 267/166 |
| 5,558,393 | A * | 9/1996 | Hawkins et al. | 267/162 |
| 6,186,488 | B1 * | 2/2001 | Lauer | 267/287 |
| 6,209,798 | B1 | 4/2001 | Martin et al. | |
| 6,328,232 | B1 | 12/2001 | Haltiner, Jr. et al. | |
| 6,619,638 | B1 | 9/2003 | Spencer | |

* cited by examiner

*Primary Examiner*—Thomas Moulis
(74) *Attorney, Agent, or Firm*—D. Jim Barnes

(57) ABSTRACT

A compression spring assembly is disclosed herein. The compression spring assembly may be used in a fuel injection device and may include a compression spring having first and second adjacent turns spaced apart by a distance. The compression spring assembly may further include a damping element arranged between the first and second turns and having first and second spaced apart support regions separated by an arched third support region. The first and second support regions may be configured to exert force on a surface of the first turn, and the third support region may be configured to exert force on a surface of the second turn to at least inhibit movement of the first turn toward the second turn during operation of the spring.

24 Claims, 5 Drawing Sheets

SELF DAMPING COMPRESSION SPRING ASSEMBLY FOR A FUEL INJECTION DEVICE

TECHNICAL FIELD

The present invention relates generally to a spring assembly, and more particularly relates to a self-damping compression spring assembly for use with a fuel injection device.

BACKGROUND

Fuel injection devices, such as fuel injectors, fuel pumps, and the like, typically include mechanical, spring-loaded elements for pressurizing fuel. For example, and with reference to FIG. 1, some fuel injectors 10 are mechanically actuated via a rocker arm assembly 14 that moves with each rotation of an engine's cam shaft 18. The rocker arm assembly 14 moves a tappet 22 and a plunger 24 downward to pressurize fuel within a fuel cavity inside the fuel injector 10. Pressure within the fuel cavity builds until a threshold pressure is reached. Once the threshold pressure is reached, the injector 10 opens at its forward end 32 to expel pressurized fuel from the fuel cavity. As fuel is expelled, pressure within the fuel cavity decreases rapidly, causing the tappet 22 and the plunger 24 to accelerate downward. A compression spring 26 acts upon the tappet 22 and the plunger 24 to offset the downward acceleration of the tappet 22 and the plunger 24 and to return them to their pre-injection positions.

During operation of the fuel injector 10, the compression spring 26 is subject to dynamic loading, which can create internal oscillations in the spring 26. Such oscillations, or "surge modes", may cause undesirable conditions within the fuel injector 10, such as increased dynamic stress within the spring 26 and clashing between adjacent spring turns 28 or between a spring tang 29 (i.e., an end turn) and an adjacent turn 28. Such conditions may ultimately cause spring failure within the fuel injector 10. Thus, prior art fuel injector devices may be improved by providing means for reducing such conditions.

The present invention is directed at overcoming one or more disadvantages associated with prior fuel injector springs.

SUMMARY OF THE INVENTION

In one aspect of the present invention, a compression spring assembly is disclosed. The compression spring assembly may be used in a fuel injection device and may include a compression spring having first and second adjacent turns spaced apart by a distance. The compression spring assembly may further include a damping element arranged between the first and second turns and having first and second spaced apart support regions separated by an arched third support region. The first and second support regions may be configured to exert force on a surface of the first turn, and the third support region may be configured to exert force on a surface of the second turn to at least inhibit movement of the first turn toward the second turn during operation of the spring.

In another aspect of the present invention, a method for assembling a compression spring for use in a fuel injection device is disclosed. The method may include arranging a damping element between first and second adjacent turns of the compression spring so that (i) first and second spaced apart support regions of the damping element engage a surface of the first turn and (ii) an arched third support region of the damping element separating the first and second support regions engages a surface of the second turn.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings.

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Figure 1:
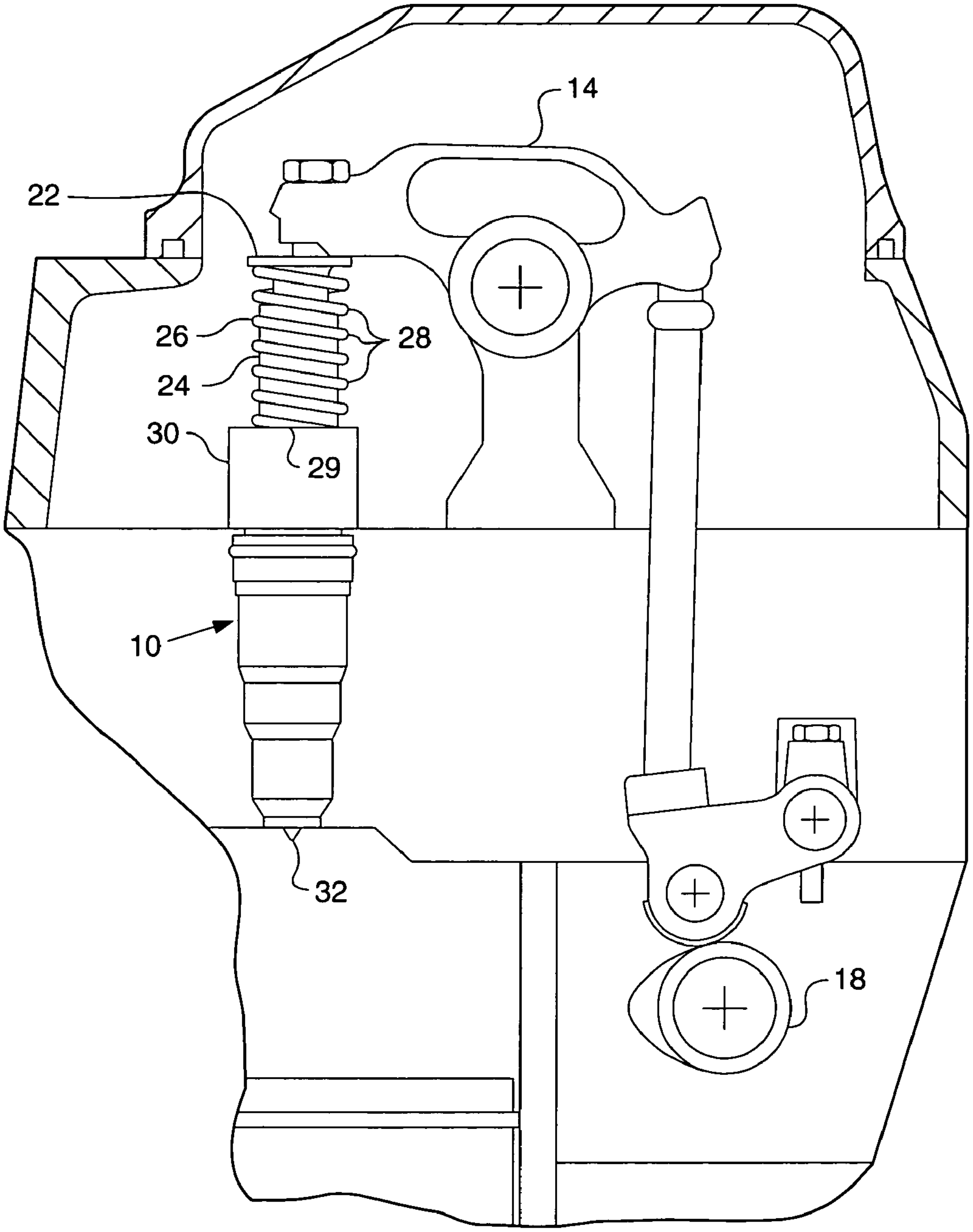
FIG. 1 is a sectioned side diagrammatic view of an engine with a fuel injector having a prior art compression spring assembly.
Figure 2:
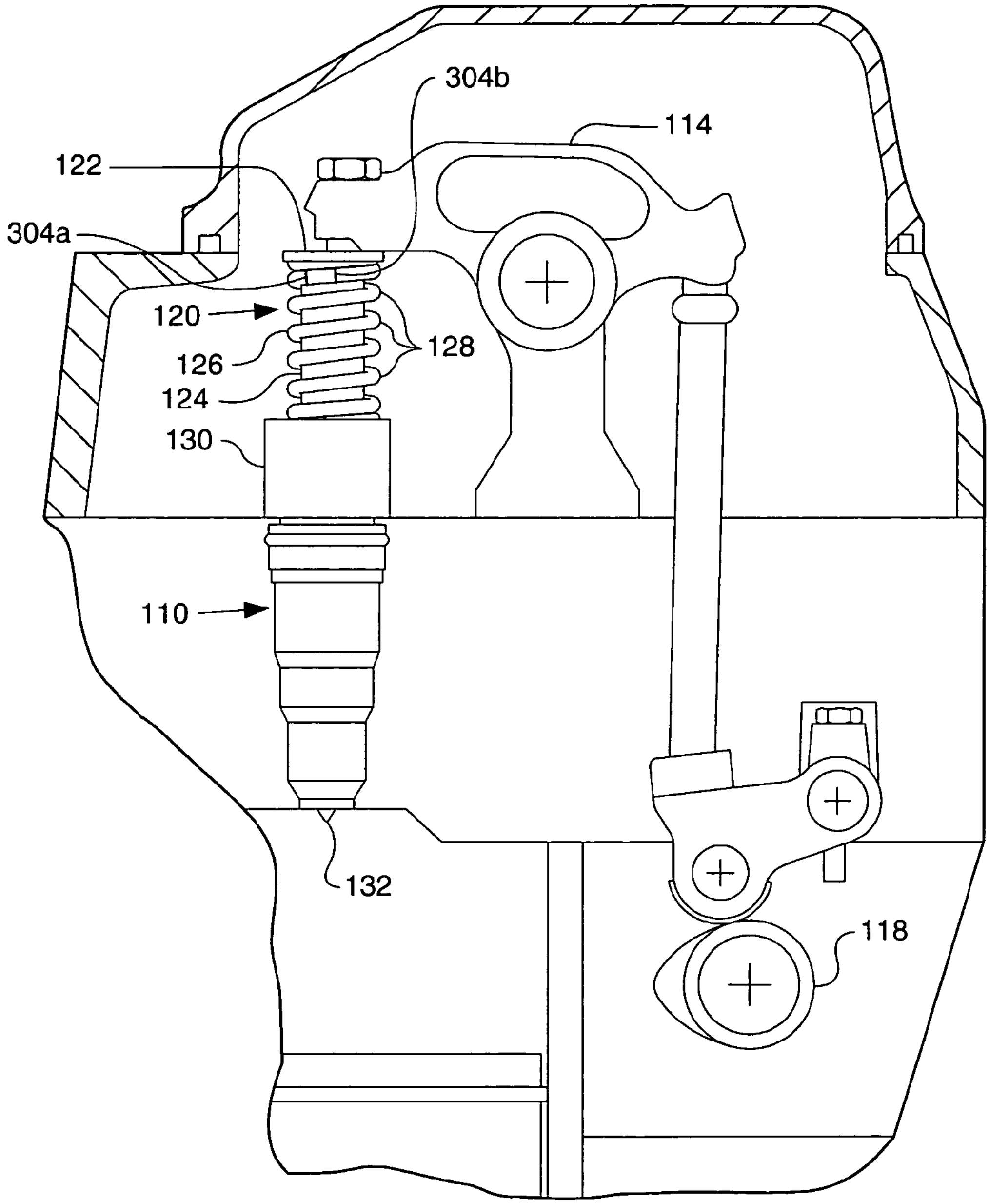
FIG. 2 is a sectioned side diagrammatic view of an engine with a fuel injector having a compression spring assembly in accordance with an aspect of the present invention.

With reference to FIG. 2, an example of a fuel injector 110 suitable for use with the present invention is shown. The fuel injector 110 is mechanically actuated via a rocker arm assembly 114 that moves with each rotation of an engine's cam shaft 118. The rocker arm assembly 114 moves a tappet 122 and a plunger 124 downward to pressurize fuel within a fuel cavity inside the fuel injector 110. Pressure within the fuel cavity builds until a threshold pressure is reached. Once the threshold pressure is reached, the injector 110 opens at its forward end 132 to expel pressurized fuel from the fuel cavity. As a result, pressure within the fuel cavity rapidly decreases, causing the tappet 122 and the plunger 124 to accelerate downward. A compression spring assembly 120, as described in greater detail hereinbelow, acts upon the tappet 122 and the plunger 124 to offset the downward acceleration of the tappet 122 and the plunger 124 and to return them to their pre-injection positions.

With reference to FIGS. 2-5, the compression spring assembly 120 may include a compression spring 126, a damping element 200, and a restraining structure 300. The compression spring assembly 120 may be inserted between first and second fuel injector members, for example between the tappet 122 and a fuel injector body 130, to bias the members 122, 130 away from each other during operation of the fuel injector 110. The compression spring assembly 120 may be disposed around the tappet member 122.

Figure 3:
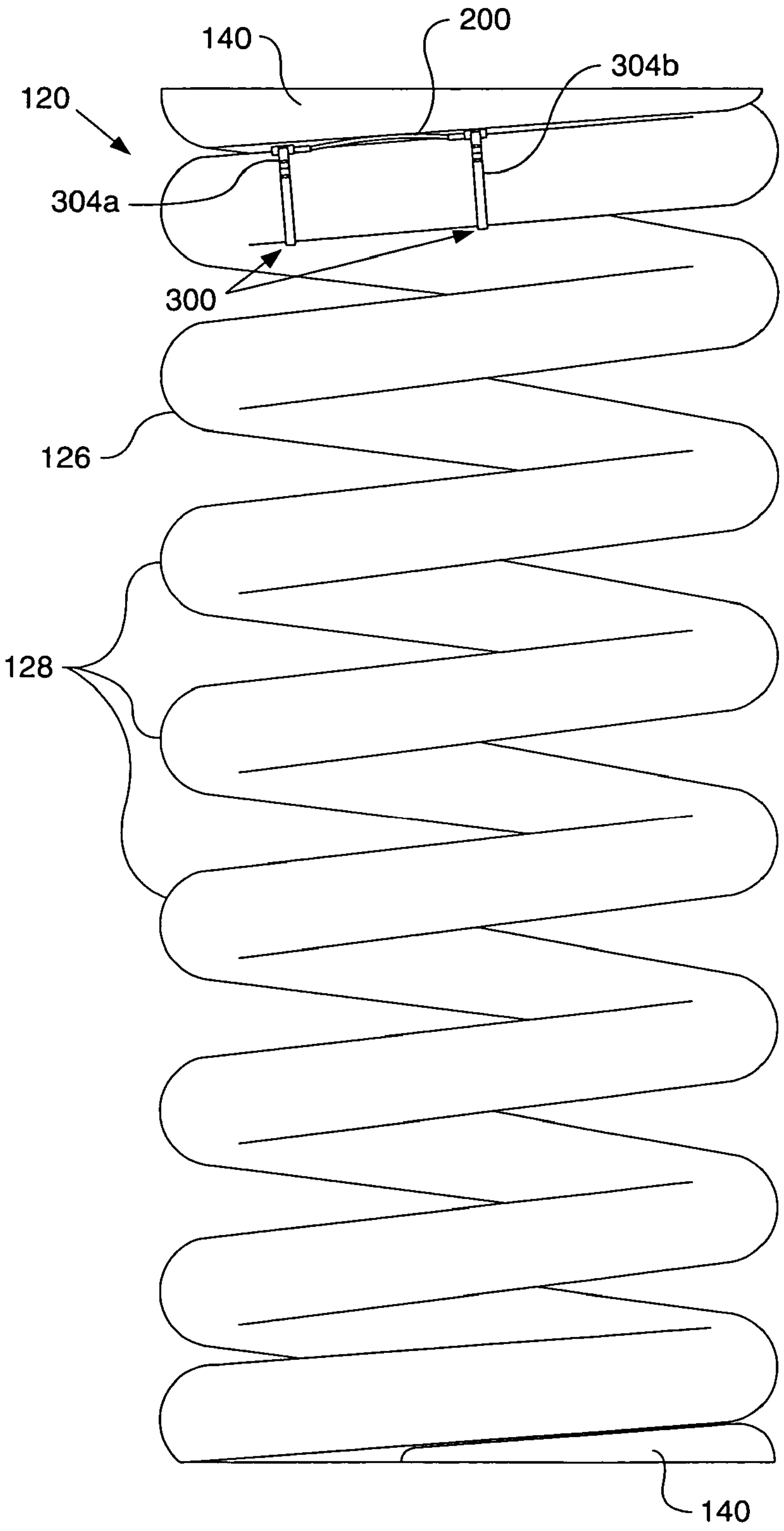
FIG. 3 is an enlarged partial side view of the compression spring assembly of FIG. 2.
Figure 4:
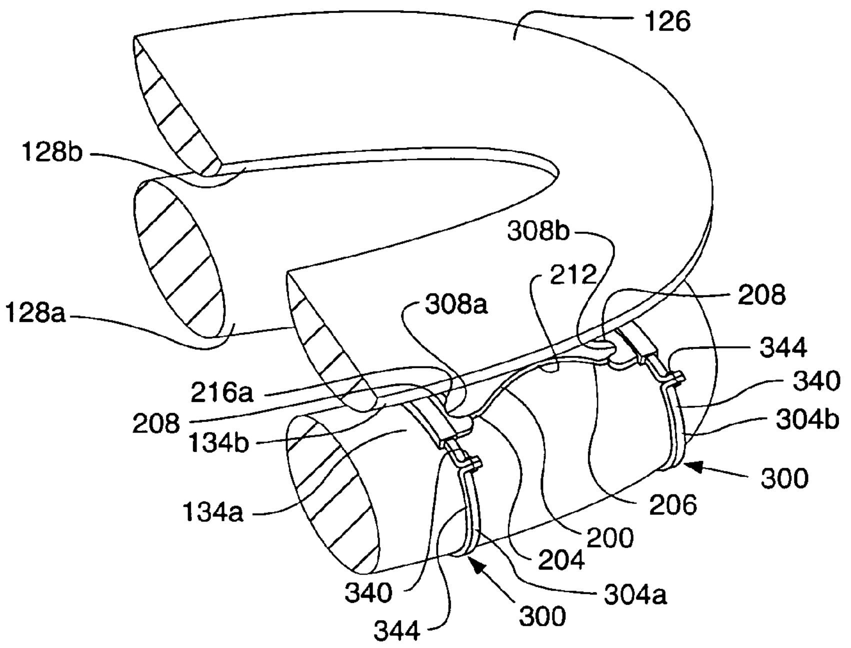
FIG. 4 is an enlarged partial perspective view of the compression spring assembly of FIG. 2.
Figure 5:
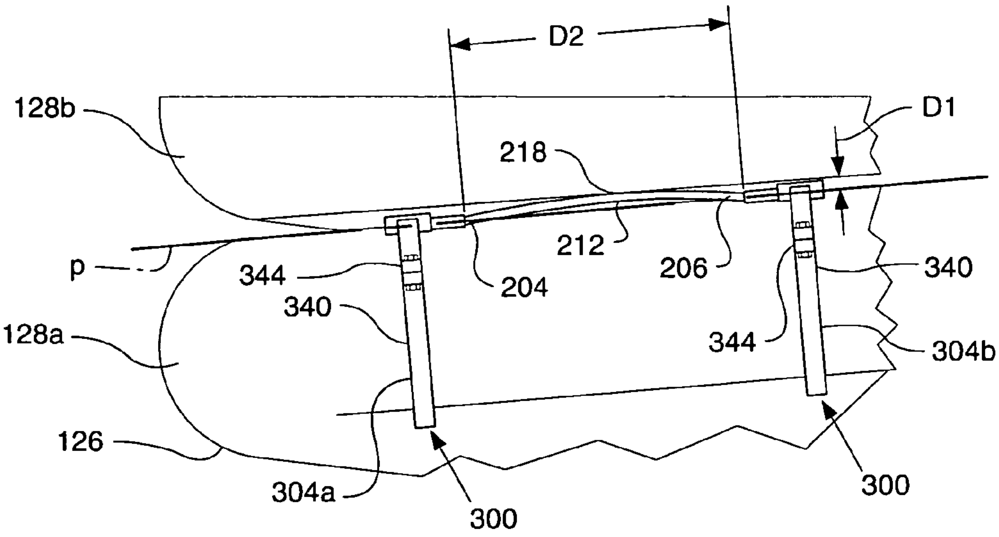
FIG. 5 is an enlarged partial side view of the compression spring assembly of FIG. 2.

The compression spring 126 includes a plurality of turns 128, including for example first and second turns 128*a*, 128*b* spaced apart by a distance D1 (FIG. 5). For example, the turns 128 may comprise a tang 128*b*, 140 (i.e., an end turn) and an adjacent turn 128*a* as shown in FIGS. 3 and 4, or the turns 128 may comprise turns 128 located away from an end portion of the spring 126. Each turn 128 may have a nonplanar surface contour 134*a*, 134*b* (FIG. 4). For example, the turns 128 may have a generally circular cross-section such that the surface contours 134 thereof have a corresponding curved contour. It should be appreciated that although the turns 128 are shown having curved circular cross-sections, any appropriate cross-sectional configuration for a turn 128 may be used.

A damping element 200, for example a curved or otherwise bent or angled beam made from the same material as the spring 126, may be arranged between the first and second turns 128*a*, 128*b* to perform a spring damping function during operation of the spring assembly 120. The damping element 200 may include first and second spaced apart support regions 204, 206, the support regions being configured to support the damping element 200 upon the first turn 128*a* and engaging the surface 134*a* of the first turn 128*a*. Thus, the support regions 204, 206 may cooperate to exert force on the first turn 128*a*. In one embodiment, each of the first and second support regions 204, 206 has a generally nonplanar contoured surface 208 configured to substantially match a corresponding surface contour 134*a* of the first turn 128*a*. The first and second support regions 204, 206 may be separated by a distance D2 (FIG. 5) and arranged along an axis A, the axis A being aligned generally parallel with a surface of the first turn 128*a*.

The damping element 200 may further include a third support region 212 arranged between and separating the first and second support regions 204, 206. The third support region 212 may have an arched configuration (e.g., a curved or otherwise bent or angled configuration) with an apex region 218 (FIG. 5) engaging a surface of the second turn 128*b*. As shown in FIGS. 4 and 5, the arch shape of the third support region 212 may generally bend away from the second turn 128*b* and toward the first turn 128*a*.

It should be appreciated that the thickness, curvature, and other dimensional and material characteristics of the damping element 200 may be modified as desired to achieve differing damping characteristics.

The compression spring assembly 120 may further include a restraining structure 300 coupled to the spring 126 and configured and arranged relative the damping element 200 to at least inhibit movement of the damping element 200 relative the spring 126. In one embodiment, the restraining structure 300 includes two spaced apart restraining members 304*a*, 304*b* fixedly coupled to the spring 126 and arranged proximate opposite ends of the damping element 200 to at least inhibit movement of the damping element 200 relative the spring 126.

Figure 6:
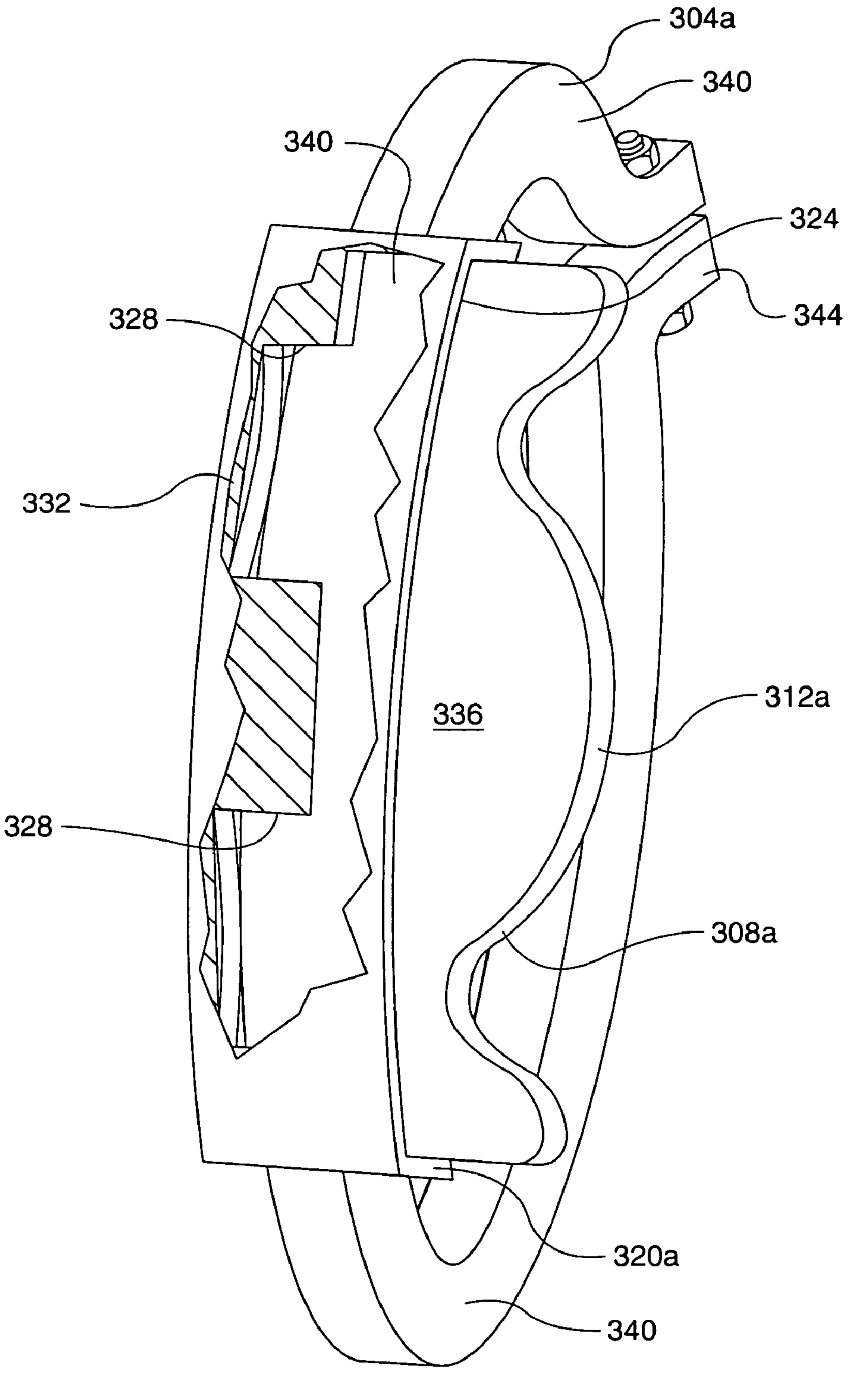
FIG. 6 is an enlarged sectioned perspective view of a restraining member in accordance with an aspect of the present invention.

With reference to FIGS. 4-6, each restraining member 304*a*, 304*b* may include a restraining shoulder 308*a*, 308*b* disposed adjacent one of the first support regions 204, 206 of the damping element 200 and configured for engagement with the support region 204, 206. Each shoulder 308*a* may have a contoured surface 312*a* (FIG. 6) to mate with a generally matching contoured surface 216*a* (FIG. 4) on the damping element 200, for example to at least inhibit lateral movement (e.g., transverse to axis A) of the damping element 200 relative the restraining member 304*a* during operation of the spring 126.

In one embodiment, at least one of the restraining shoulders 308*a*, 308*b* is a resilient shoulder member configured and arranged to engage the damping element 200 and to inhibit but allow limited movement of the damping element relative the spring 126 during operation of the spring 126. For example, and with reference to FIG. 6, at least one of the restraining members 304*a* may form a housing 320*a* having a channel 324 formed therein. The channel 324 may include one or more slots 328 formed therein. A damper plate 336 having notches 340 extending therefrom may be arranged within the channel 324 so that the notches extend into the slots 328. Engagement between the notches 340 and the slots 328 may prevent undesired transverse movement of the damper plate 336 relative the housing 320*a*. Resilient spring members 332, such as curved beams made from the same material as the spring 126, may be arranged within the slots 328 between the housing 320*a* and the damper plate 336 so that when the damper plate 336 is pressed into the channel 324 toward the spring members 332 and released, the spring members 332 will urge the damper plate 336 toward its original position, pushing it partially outward of the channel 324. Thus, the restraining member 304*a* provides a resilient shoulder 308*a* for engagement with the damping element 200 to at least inhibit movement of the damping element 200 relative the spring 126.

Each restraining member 304*a*, 304*b* may be fixedly attached to the spring 126, for example via arms 340 extending around the surface of one of the turns 128*a*. In one embodiment, the arms 340 are latched together via a nut-and-bolt type configuration 344.

INDUSTRIAL APPLICABILITY

Assembly and operation of the disclosed apparatus is described hereinbelow with further reference to FIGS. 2-6.

During assembly, the restraining members 304*a*, 304*b* may be fixedly coupled to the first turn 128*a* so that the restraining members 304*a*, 304*b* are separated by a desired distance sufficient to enable insertion of the damping element 200 therebetween. It should be appreciated that, if desired, the distance between the restraining members 304*a*, 304*b* may be chosen so that a predetermined clearance exists between the restraining structure 300 and at least one end of the damping element 200 when the spring is in an uncompressed state.

Adjacent turns 128*a*, 128*b* may be separated by increasing the distance D1, and damping element 200 may be inserted therebetween, for example so that the damping element 200 is held between turns 128*a*, 128*b* in a partial— or pre-loaded state. In one arrangement, the damping element 200 may be inserted so that: (i) the first and second support regions 204, 206 engage the first turn 128*a* to exert force thereon, and (ii) the arched third support region 212 engages the second turn 128*b* to exert force thereon and to at least inhibit movement of the first turn toward the second turn during operation of the spring 126.

During compression of the spring 126, the first and second turns 128*a*, 128*b* are pressed toward each other so that the damping element 200 is compressed therebetween. As a result, the damping element 200 deforms under the load of the spring compression and the arched region of the damping element 200 tends toward a flattened (e.g., straightened) shape. Further, at least one of the first support regions 204, 206 may slide along the surface of the first turn 128*a* in a direction generally parallel with the first turn 128*a* so that the first support regions 204, 206 move away from each other to extend the distance D2. When the compressing force is removed from the spring 126, the damping element 200 (in combination with the spring's own resilient internal forces) acts on the first and second turns 128*a*, 128*b* to bias them toward a separated condition. As the first and second turns 128*a*, 128*b* move away from each other, the arched region of the damping element 200 tends toward its original arched configuration, and at least one of the first support regions 204, 206 may slide along the first turn 128*a* so that the regions 204, 206 move closer together.

It should be appreciated that when the restraining members 304*a*, 304*b* are configured sufficiently proximate the support regions 204, 206, the shoulders 308*a*, 308*b* thereof may be caused to engage at least one of the support regions 204, 206 of the damping element 200 during compression of the spring 126. During such engagement, at least one of the shoulders 308*a*, 308*b* may be forced (by the respective support region 204, 206 of the damping element 200) to compress into its respective restraining housing 320*a*, 320*b* to inhibit but allow limited movement of the damping element 200 relative the spring 126.

In one embodiment, portions of the restraining members 304*a*, 304*b* arranged directly between the first and second turns 128*a*, 128*b* have a width less than the corresponding width(s) of the damping element 200 so that when the spring 126 is fully compressed, the load of the spring 126 may be supported by the width of the damping element 200 rather than by the restraining members 304*a*, 304*b*.

The compression spring assembly 200 as described herein may be used, for example, within a fuel injection device to at least inhibit undesired spring surge modes therein and to dissipate impact energy between adjacent spring turns.

The damping element 200 and restraining structure 300 may be arranged between any two spring turns 128 that are anticipated to experience unwanted clashes or higher than desired stresses. In one method according to the present invention, a spring 126 may be evaluated to predict a region thereon that would experience an undesirable turn clash or an undesirable shear stress during an operation motion of the spring 126. For example, a spring may be evaluated using a finite element analysis (FEA) process or by inspection of similarly constructed failed spring assemblies to predict a region ("critical region") on the spring that would experience a high turn clash effect or a high shear stress relative other regions on the spring during an operation motion of the spring. The damping element 200 may thus be arranged between first and second adjacent turns proximate the region to at least inhibit such effects at the critical region.

The present disclosure describes a compression spring assembly 120 which may be operable to effectively absorb impact energy between turns on a spring 126 to reduce surge effects or turn clashing, for example within a fuel injection device. It is estimated that maximum surge effect created within a fuel injection device during operation thereof may be reduced by approximately 12% by inserting a damping element 200 as described herein between a spring tang 128*b*, 140 (e.g., an end turn 128 of the spring 126) and an adjacent turn 128*a*. Moreover, tang impact is estimated to be reducible by approximately 84% with such a configuration. Further, spring surge effect is estimated to be reducible by approximately 27% within the spring 126 by inserting the disclosed damping element 200 between first and second turns proximate a critical region of the spring 126.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples, for example use of the invention relative a fuel injection device, be considered as exemplary only, with a true scope and spirit of the invention being indicated by the following claims and their equivalents. Accordingly, the invention is not limited except as by the appended claims.

What is claimed is:

1. A compression spring assembly, comprising:

a compression spring having first and second adjacent turns spaced apart by a distance;

a damping element arranged between the first and second turns and having first and second spaced apart support regions separated by an arched third support region, the first and second support regions cooperating to exert force on a surface of the first turn, and the third support region configured to exert force on a surface of the second turn to at least inhibit movement of the first turn toward the second turn during operation of the spring.

2. The assembly of claim 1, wherein:

the first and second support regions engage a surface of the first turn; and the third support region engages a surface of the second turn.

3. The assembly of claim 1, wherein the first and second support regions are separated by a distance and arranged along an axis, the axis being aligned generally parallel with the first turn.

4. The assembly of claim 1, wherein the damping element is configured and arranged between the first and second turns so that compression of the spring causes one of the first and second support regions to move away from the other of the first and second support regions along a path substantially parallel to the first turn.

5. The assembly of claim 4, wherein the damping element is configured and arranged between the first and second turns so that compression of the spring causes at least one of the first and second support regions to slide along the surface of the first turn in a direction generally parallel with the first turn.

6. The assembly of claim 1, wherein the third support region has an arch shape generally bending away from the second turn and toward the first turn.

7. The assembly of claim 6, wherein the third support region tends towards a flattened shaped when the spring is compressed.

8. The assembly of claim 6, wherein the third support region includes an apex region engaging a surface of the second turn.

9. The assembly of claim 8, wherein the damping element is a curved beam.

10. The assembly of claim 1, including a restraining structure coupled to the spring and configured and arranged relative the damping element to at least inhibit movement of the damping element relative the spring.

11. The assembly of claim 10, wherein the restraining structure includes a first shoulder disposed adjacent the first support region of the damping element for engagement with the damping element and a second shoulder disposed adjacent the second support region of the damping element for engagement with the damping element.

12. The assembly of claim 10, wherein a portion of the restraining structure is wrapped at least partially around one of the first and second turns for coupling the restraining structure with the spring.

13. The assembly of claim 10, wherein the restraining structure includes first and second spaced apart restraining members fixedly coupled to the spring and arranged proximate opposite ends of the damping element, the restraining members cooperating to at least inhibit movement of the damping element relative the spring.

14. The assembly of claim 13, wherein at least one of the restraining members includes a resilient shoulder member configured and arranged to engage an end portion of the damping element and to inhibit but allow limited movement of the end portion relative the spring during compression of the spring.

15. A fuel injector assembly comprising:

first and second fuel injector members biased away from each other via a compression spring assembly including (i) a compression spring with first and second adjacent turns spaced apart by a distance and (ii) a damping element arranged between the first and second turns and having first and second spaced apart support regions separated by an arched third support region, the first and second support regions cooperating to exert force on a surface of the first turn, and the third support region configured to exert force on a surface of the second turn to at least inhibit movement of the first turn toward the second turn during operation of the spring.

16. The fuel injector assembly of claim 15, wherein:

the first and second support regions engage a surface of the first turn; and the third support region engages a surface of the second turn.

17. The fuel injector assembly of claim 15, wherein the first fuel injector member is a tappet member.

18. The fuel injector member of claim 17, wherein the compression spring is disposed around the tappet member.

19. A method for assembling a compression spring, comprising:

arranging a damping element between first and second adjacent turns of the compression spring so that (i) first and second spaced apart support regions of the damping element cooperate to exert force on a surface of the first turn and (ii) an arched third support region of the damping element separating the first and second support regions is configured to exert force on a surface of the second turn.

20. The method of claim 19, wherein the step of arranging a damping element includes arranging the damping element between first and second adjacent turns of the compression spring so that (i) first and second spaced apart support regions of the damping element engage a surface of the first turn and (ii) the arched third support region of the damping element separating the first and second support regions engages a surface of the second turn.

21. The method of claim 19, including fixedly coupling a restraining structure to the spring for engagement with the damping element to at least inhibit movement of the damping element relative the spring.

22. The method of claim 19, including:

predicting a region on the spring that would experience an undesirable turn clash or an undesirable shear stress during an operation motion of the spring;

wherein the step of inserting the damping element between first and second adjacent turns includes inserting the damping element at a location proximate the region.

23. The method of claim 22, wherein the step of predicting a region on the spring that would experience an undesirable turn clash or an undesirable shear stress during an operation motion of the spring includes predicting a region on the spring that would experience a high turn clash effect or a high shear stress relative other regions on the spring during an operation motion of the spring.

24. The method of claim 19, including inserting the compression spring between two components of a fuel injection device.

* * * * *